United States Patent [19]

Frazier et al.

[11] Patent Number: 4,595,387
[45] Date of Patent: Jun. 17, 1986

[54] V-BELT

[75] Inventors: John P. Frazier; Donald R. McComber, both of Littleton; Gerhard D. Nichols, Sedalia, all of Colo.

[73] Assignee: The Gates Rubber Company, Colo.

[21] Appl. No.: 662,863

[22] Filed: Oct. 19, 1984

[51] Int. Cl.⁴ .......................... F16G 5/16; F16G 5/18; F16G 7/00
[52] U.S. Cl. ................... 474/201; 474/242; 474/244
[58] Field of Search ............... 474/201, 204, 206, 207, 474/237, 238, 242, 264, 265, 244

[56] References Cited

U.S. PATENT DOCUMENTS

| 4,080,841 | 3/1978 | Vollers | 474/201 |
| 4,177,687 | 12/1979 | Russ, Sr. | 474/242 |
| 4,365,965 | 12/1982 | Russ, Sr. | 474/201 X |
| 4,457,742 | 7/1984 | Hattori et al. | 474/201 |
| 4,512,753 | 4/1985 | Hattori | 474/242 |
| 4,525,160 | 6/1985 | Okawa et al. | 474/201 X |
| 4,526,561 | 7/1985 | Hattori | 474/201 X |

FOREIGN PATENT DOCUMENTS 256918 9/1948 Switzerland .

Primary Examiner—John Petrakes
Attorney, Agent, or Firm—H. W. Oberg, Jr.; C. H. Castleman, Jr.; Frank P. Grassler

[57] ABSTRACT

A belt and reinforcement for a V-block of a V-block belt is provided. The reinforcement has a generally U-shaped member with a lower beam member that interconnects diverging diagonal side members that each form a cantilevered portion. A means is provided in the cantilevered portion for retaining an upper beam member. The means is in the form of deformable sides that define a slot for receiving end portions of the upper beam member.

7 Claims, 7 Drawing Figures

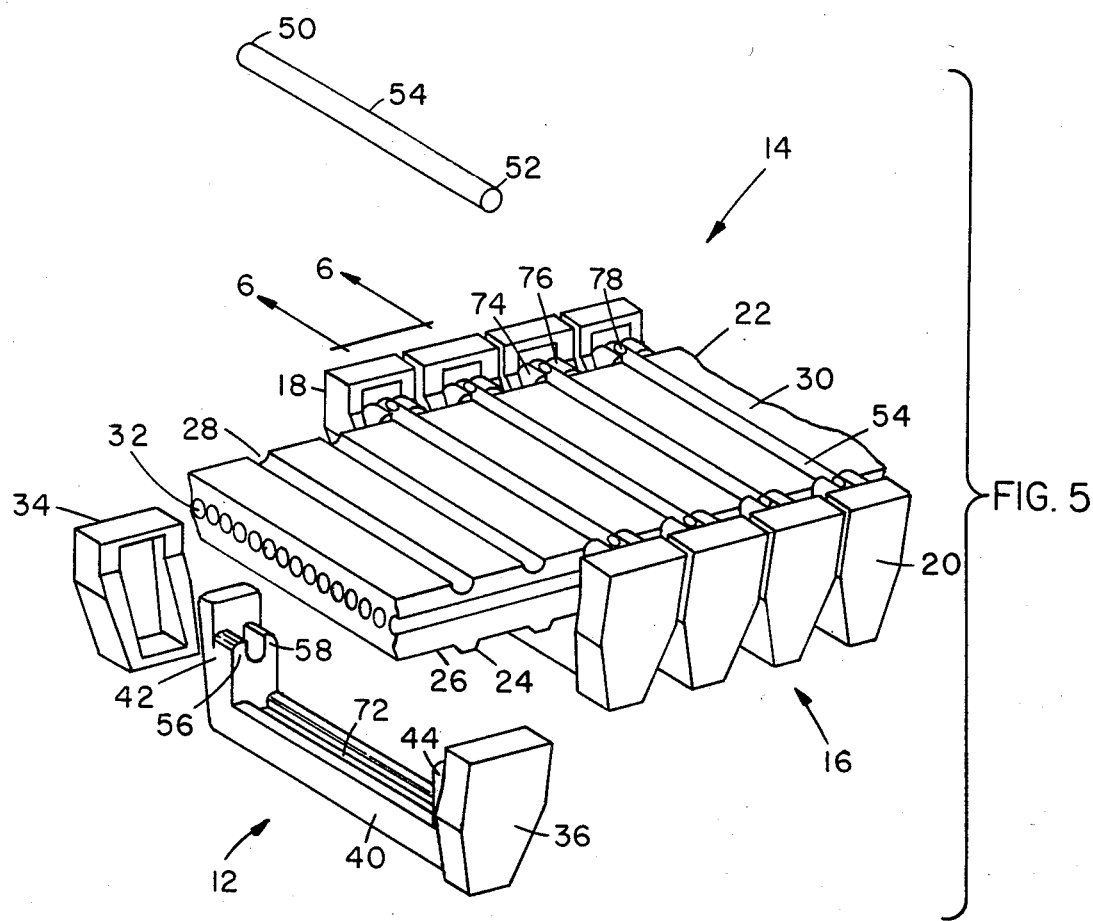
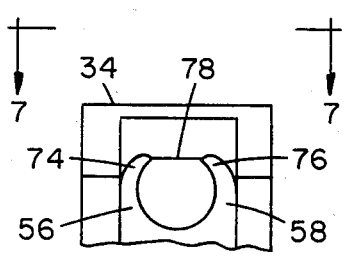
FIG. 6
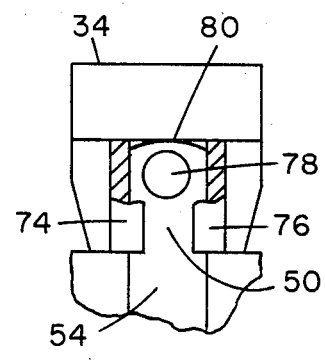
FIG. 7

V-BELT

BACKGROUND OF THE INVENTION

The invention relates to V-belts, but more particularly, the invention relates to a reinforcement for V-blocks of a V-block belt.

In one category of belts, V-blocks surround and slide on a metallic flat band member. The V-blocks are made of a high modulus material that directly contacts conical sides of a pulley without the aid of a polymeric wear surface. In such belts, power is transmitted by successive blocks pushing against each other. An example of such a block appears in FIGS. 10–12 of U.S. Pat. No. 4,457,742.

In a second category of belts, V-blocks surround and are attached to a flat band member. The blocks are made of a low modulus elastomer that also defines a friction wear surface. The blocks transmit power by pulling against the flat band tensile member. Such belts, because of their low modulus material, have a low power capability. An example of such V-blocks appear at FIGS. 14, 15 of Swiss Pat. No. 256,918 (1948).

A third category of belts has V-blocks that surround and engage ribs or teeth of a flat band type load-carrying member. The blocks have a high modulus reinforcement that engages the teeth and surrounds and supports the load-carrying member. Friction wear pads are attached to the reinforcement at oppositely facing V sides. Such belts are capable of transmitting much higher power than the second category belts. An example of a high modulus reinforcement for such a high power V-block belt appears at FIG. 5 of U.S. Pat. No. 4,177,687 (1979). The belt of the invention is directed to reinforcements and belts of the exemplary third category.

SUMMARY OF THE INVENTION

In accordance with the invention, an improved V-block type belt and a high modulus two-part reinforcement for a V-block are provided. Individual V-blocks have a reinforcement which substantially surrounds and transversely support the inner and outer sides of a flat band type load-carrying member. The reinforcement has spaced upper and lower beam members that are arranged transversely of the belt and side members that are interconnected to and form opposite diagonals with the beam members. The side members have wear surfaces of preferably a polymeric-based material.

The two-part reinforcement includes a generally U-shaped member that forms the lower beam member and diverging diagonal side members that each have a cantilevered portion. A slot is formed in an end portion of each diagonal side member and has deformable sides and a slot end which define a retaining means. An upper beam member has end portions that are disposed in the slots and are retained by deformed sides of the slot.

An object of the invention is to provide a V-block with a high modulus and substantially unarticulated reinforcement that is easily attached to a flat band type tensile member when assembling a V-block belt.

The invention is described with reference to the drawings wherein:

FIG. 5 is an exploded isometric view showing assembly of a portion of a V-block belt;

FIG. 6 is a partial view taken along the line 6—6 of FIG. 5 showing assembly of the two-part reinforcement;

FIG. 7 is a fragmented partial view taken the along the line 7—7 of FIG. 6.

DESCRIPTION OF PREFERRED EMBODIMENTS

Figure 1:
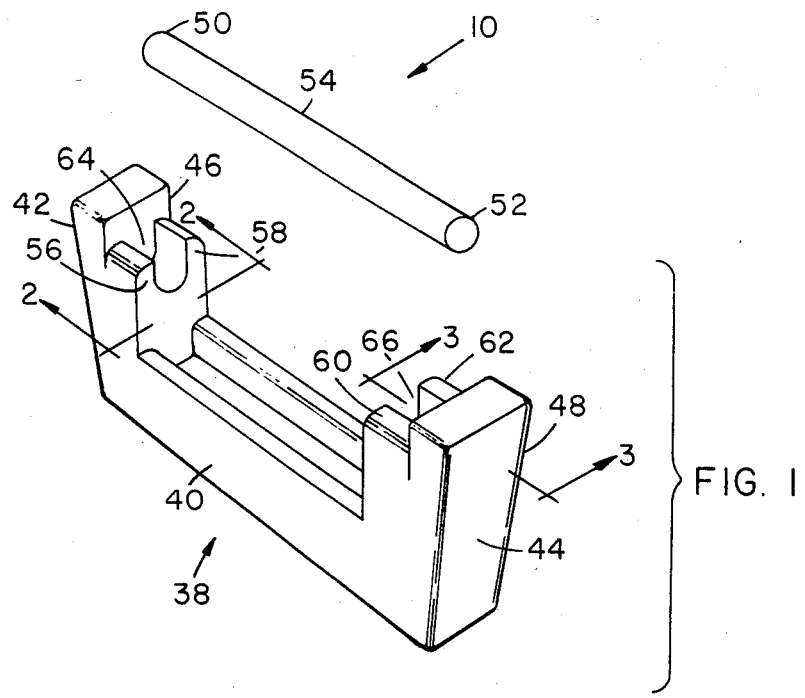
FIG. 1 is an isometric view showing an unassembled exploded view of a two-part reinforcement of the invention.

Referring to the Figures, a reinforcement 10 for a V-block 12 of a V-block belt 14 are provided. A plurality of spaced V-blocks 16 with oppositely-facing frictional driving surfaces 18,20 on the V sides of the blocks are attached to a generally flat belt type load-carrying member 22 which has a plurality of transversely oriented ribs 24 formed on its inner surface 26, and a plurality of transversely oriented grooves 28 formed on its outer surface 30. The load-carrying member may include a tensile reinforcement of spirally-wound cord 32 or the like. The frictional driving surfaces are formed of preferably polymeric pads 34,36 that attach to the reinforcement such as by integrally molding them thereto or by individually adhering them thereto.

REINFORCEMENT

Figure 2:
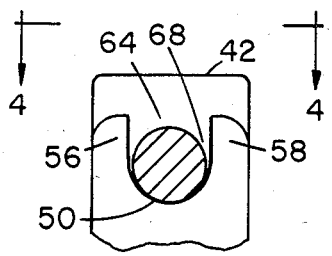
FIG. 2 is a partial view taken along the line 2—2 of FIG. 1 showing a partial assembly of the two-part reinforcement.
Figure 3:
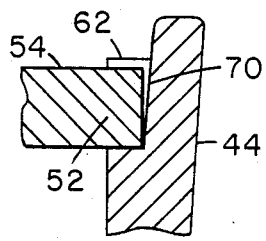
FIG. 3 is a partial view taken along the line 3—3 of FIG. 1 showing partial assembly of the two-part reinforcement.
Figure 4:
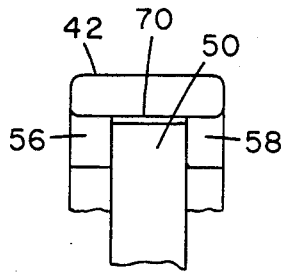
FIG. 4 is a partial view taken along the line 4—4 of FIG. 2.

FIGS. 1–4 are exemplary of an unfastened two-part reinforcement of the invention. The reinforcement has a generally U-shaped member 38 with a lower beam member 40 that integrally interconnects portions of two spaced apart, diverging diagonal side members 42,44. A cantilevered portion 46,48 of each side member has a means for retaining end portions 50,52 of an upper beam member 54. Each retaining means comprises deformable sides 56, 58, 60, 62 that define a slot 64, 66. The U-shaped member may be made of any suitable material such as steel, aluminum or plastic.

The upper beam member 54 may be in the shape of a cylindrically shaped rod that has an outside diameter that is less than a width of the slot such that there may be a clearance 68 between the slot 64 and end portion 50 of the upper beam member. The length of the upper beam member may be substantially equal to the distance between the cantilevered portions at the slots. The cantilevered portions may also have a tapered end surface 70 that is transverse to the slot and acts as a wedge that minimizes any clearance between the cantilevered portions and the end portions of the upper beam member.

BELT

Referring to FIGS. 5–7, V-blocks are placed in position on the load-carrying member. The load-carrying member is made with a groove in its outer surface and a rib projecting from its inner surface using known techniques such as those described in U.S. Pat. No. 4,177,687. The lower beam member has a slot 72 sized to receive a transversally oriented rib on the load-carrying member. The transversely oriented slot on load-carrying member is sized to receive the cylindrically shaped upper beam member. After a V-block is placed in position, the upper beam member is attached to the cantilevered portions by deforming the sides such as by crimping. The deformable side portions may partially encircle 74,76 the end portion of the upper beam member and minimize or eliminate any clearance therebetween to hold the end portion securely. Optionally, the end portions 50,52 may be partially flattened 78 or generally splayed to minimize or eliminate any clearance 70 so that the upper beam member abuts 80 the cantilevered portion. A so-assembled V-block completely surrounds and supports the load-carrying member. The crimped sides grip the end portions of the upper beam member such that there is little or no articulation of the attachment. Also, the upper beam member transversally supports the diverging diagonal side members to substantially eliminate any cantilever bending in relation to the lower beam member when the belt is in use.

To illustrate the effectiveness of the reinforcement of the invention, a belt with the following characteristics is constructed:

Top Width: 52.3 mm
Thickness: 20.8 mm
Load-Carrying Tensile Member: Rubber reinforced with a tensile reinforcement of spirally wound aramid cord
Friction Drive Surface Polymer: Rubber-fiber composite
Angle Between Diverging Sides: 30°
Length: 1133 mm
Number of the Blocks: 97
Reinforcement Material: Die Cast Aluminum The belt was subjected to the following test conditions for a period of 20.7 hours:

Sheave Pitch Diameter: 142 mm
Speed: 1750 RPM
Horsepower: 32

The foregoing description is made for purpose of illustration only and is not intended to limit the scope of the invention which is to be determined from the appended claims.

What is claimed is:

1. In a power transmission belt of the type having a plurality of V-blocks attached to a generally flat band type load carrying member, the blocks each having a reinforcement that encircles and supports the load-carrying member, wherein improvement in the reinforcement comprises:

a generally U-shaped member having a lower beam member integrally interconnecting end portions of two spaced apart, diverging diagonal side members that each have a cantilevered portion with a means for retaining an upper beam member, the retaining means comprising deformable sides that define a slot that is longitudinally oriented with the lower beam member; and an upper beam member that is substantially parallel to the lower beam member and having two end portions which individually fit in one of the slots, the deformable sides of the slots crimped against and retaining the end portions of the upper beam member whereby the beam member transversely supports diverging diagonal side members.

2. The power transmission belt as claimed in claim 1 wherein part of each upper beam end portion is partially flattened which minimizes any clearance between the end portions of the upper beam and slots.

3. The power transmission belt as claimed in claim 1 wherein the upper beam member is a cylindrically shaped rod.

4. The power transmission belt as claimed in claim 3 wherein the side portions at least partially encircle part of the end portions of the upper beam member.

5. The power transmission belt as claimed in claim 3 wherein part of the end portions of the cylindrically shaped rod are generally splayed which minimizes any clearance between the end portion and the cantilevered portions.

6. The power transmission belt as claimed in claim 1 wherein each cantilevered portion defines a slot end with a wedging surface portion.

7. A reinforcement element for a V-belt comprising:

a generally U-shaped member integrally interconnecting end portions of two spaced apart, diverging diagonal side members that each have a cantilevered portion with a means for retaining an upper beam member, the retaining means comprising deformable sides that define a slot that is longitudinally oriented with the lower beam member; and an upper beam member that is substantially parallel to the lower beam member and having two end portions which individually fit in one of the slots, the deformable sides of the slots crimpable against the end portion for retaining the upper beam member.

* * * * *